Patented May 22, 1945

2,376,688

UNITED STATES PATENT OFFICE 2,376,688

THERMOPLASTIC FIBROUS PRODUCT

Philip Goldstein, Bridgewater, and Harold R. Gillette, Boston, Mass., assignors to Federal Electric Co., Inc., Chicago, Ill., a corporation of New York No Drawing. Application June 7, 1943, Serial No. 489,956

6 Claims. (Cl. 92—3)

This application is a continuation-in-part of our co-pending application Serial No. 258,577, filed February 25, 1939.

This invention relates to the production of resinous felted fibrous compositions from a combination of fibrous pulp, a resin derived from the extraction of pine wood pitch and a modifying agent, which composition is susceptible to consolidation under heat and pressure to produce a product having physical properties particularly suitable for structural uses and other purposes.

The intermediate and final products of our invention are of the thermoplastic rather than the thermo-setting or thermo-curing type. The consolidated product is highly resistant to water and moisture and resistant to petroleum solvents in general; is highly non-brittle even though the resin is per se extremely frangible and brittle.

More particularly, the present invention is characterized with the fibres and the specific resin contemplated herein, at one or more intermediate steps of the process and prior to final consolidation under heat and pressure, so as to produce in situ a resin reaction product, and to provide the ultimate composition with enhanced resistance to softening, water and moisture absorption, and tendency to disintegrate or delaminate under the influence of moisture or water. Other characteristics and properties of the process and the final consolidated product will be brought out later in this specification.

In our invention there is employed, in conjunction with the fibrous pulp, a plastic resinous material which is inexpensive and available in large quantities and which, when properly combined with the fibers and the basic modifying agent, and consolidated in accordance with our invention results in a product of relatively considerable resistance to the absorption of moisture and to warping; has desirable structural properties particularly in respect to rigidity and resistance to cracking, shattering, breakage; possesses a desirable range of elastic resistance to deformation which renders it durable in normal use; has enhanced desirable resistance to deformation under moderately elevated temperatures such as would be encountered in many uses; has exceptionally desirable surface stability; and laminated products have high resistance to separation.

The resinous material may be incorporated by suitable beater treatment with fibrous material as set forth in the Richter-Gillette Patent No. 2,264,189, to form a continuous web by conventional paper machine equipment, with subsequent drying of such web by conventional means, and the uniting or consolidation under heat and pressure of the web or webs thereby formed to produce a homogeneous and rigid structure.

In accordance with the present invention the basic material may be incorporated in the foregoing process by addition to the beater or other mixing device, or dusted onto the surfaces of the formed webs which are to be laminated, or both methods of incorporation may be jointly used with enhanced ultimate effect.

The extracted pine wood pitch resin employed comprises a residue low in abietic acid remaining after the separation of refined rosin high in abietic acid from the resinous material obtained by extraction of pine wood with a solvent. A commercial variety of such a resin is presently sold under the trade name "Vinsol."

The fibrous material or pulp or paper stock may be of any conventional type, capable of being formed into sheets or layers, such as rag, sulphite or kraft pulps, or the pulps formed from waste papers and the like cellulosic materials, or even mineral fibres, it being understood by anyone skilled in the art that the characteristics of the final product will depend in some degree upon the stock employed.

Products having good structural properties have been formed from pulp mixtures containing a quantity of resin substantially equal in weight to the weight of the admixed fibers, as well as from mixtures containing from forty to sixty percent of the resin with respect to the total resin fiber mixture. On the other hand, results satisfactory for certain purposes have been obtained employing from 10% to 70% of resin by weight of the resin-fiber mixture.

The basic material added in accordance with the present invention for the purpose of increasing the ultimate heat resistance of the final product, its resistance to unmolding and delamination, and resistance to water and moisture absorption, comprises preferably zinc oxide or lime. More generally it includes a substance selected from the group consisting of the oxides and hydroxides of zinc, calcium, lead and magnesium, although it will be understood that all of these materials do not produce fully equivalent results, and that different proportions may be required to produce related results. For example, equivalent amounts of calcium oxide or zinc oxide initially introduced to the beater will have the same hardening effect in the ultimate hot pressed product, even though a small amount of the lime introduced is lost in the white water as a result of its slight solubility. However, lime has a slightly greater hardening effect than zinc oxide, so that even though the amount of lime retained in the sheeted or felted web is somewhat smaller than the retained amount of zinc oxide, yet the ultimate hardness starting with substantially the same amount of materials is substantially the same. Also, due to the relative cheapness of lime, if found necessary or desirable, a slight excess thereof may be initially introduced in the beater to compensate for the slight loss by solution.

These basic metal compounds may be added in varying amounts provided that a substantial percentage is present sufficient to cause the desired increase in melting or softening point of the resin, and to provide satisfactory resistance to water and moisture absorption with attendant increase in resistance to unmolding and delamination of the ultimate product. It has thus been found that the addition of the basic metal compound in the proportion of from about 5% to about 25%, and preferably from about 10% to about 15% by weight of the resin to the beater, and in an amount sufficient to incorporate in sheeted material at least 3% to 4% by weight thereof of the basic metal compound, permits formation of a satisfactory ultimate product.

Thus, for example, by incorporation of about 12½% of the basic metal compound by weight of extracted pine wood pitch to the beater in a furnish composed of about 50% by weight of the resin, and giving consideration to a loss of these substances of about 10% and not over 20% of the charge to the white water in the treatment of the pulp on a conventional board or paper-forming machine, the dried sheeted product will contain about 5% by weight of the basic metal compound, which is an average and satisfactory percentage conducive to the formation of an ultimate consolidated product of desirable, new and improved characteristics.

In one specific embodiment of the present invention, the basic metal compound is provided in powdered form and is admixed in a small quantity of water with the wetting agent and the extracted pine wood pitch, to provide a fluid, homogeneous slurry, which in turn is introduced into the beater containing the paper pulp.

When forming a sheet or board in accordance with the general process of the aforesaid Patent No. 2,264,189, drying may likewise take place at conventional paper or board drying temperatures since no detrimental effect upon the resinous material or any possible reaction products thereof with the basic metal compound, is caused at such temperatures, in contrast with many of the known synthetic resins which tend to cure at such temperatures.

After drying, the board or sheet product is consolidated under heat and pressure conditions correlated to bring about the desired degree of consolidation and flow of the resin and to bring about an appreciable in situ reaction between the extracted pine wood pitch resin and the basic metal compound, with a resultant elevation in the softening point and enhancement of the binding qualities of the resin, or at least an appreciable portion of the resin content of the sheet or board.

Following is an illustrative example of the formation of resinous-fibrous products in accordance with our invention. A beater furnish of the following composition is prepared:

|  | Pounds |
|---|---|
| Kraft pulp | 40 |
| Resin (e. g. Vinsol) | 50 |
| Zinc oxide (St. Joe) | 6¼ |

The beater is charged in a conventional manner with the pulp and water. After defiberization of the pulp, the resin and zinc oxide are added in the form of finely divided powders and thoroughly admixed with the stock in the beater.

In some instances it may be desirable to utilize a so-called wetting agent. In those cases the powdered resin, zinc oxide and the wetting agent, which may be an alkyl aryl sulphonate such as Nacconol NR are made up into a thin slurry with sufficient water to thoroughly wet out the powdered resin and zinc oxide, and the thin slurry added to the stock in the beater.

It will thus be evident that in accordance with the present invention there is provided an improved method for increasing the resistance of the extracted pine wood pitch resin to softening and for increasing its efficacy as a binder by a simple, expeditious and economical method which eliminates preliminary extended cooking or treatment steps. Thus, for example, when zinc oxide is added in any percentage to Vinsol and the mixture heated in the absence of fibres and pressure, even to temperatures as high as 450° F., there is a formation of about 1 to 2% at the most of a reaction product. To bring about any considerable amount of reaction between Vinsol and zinc oxide requires temperatures upwards of 500° F., for example, at 570° F., the addition of 12% of zinc oxide will cause the formation of about 82% of a yellow alcohol insoluble reaction product.

As distinguished from the foregoing, we have found that without the necessity for using such high temperatures and without preliminary treatment, we have been enabled by incorporating powdered, finely divided and unreacted extracted pine wood pitch resin with a paper pulp and adding thereto from about 10 to about 12½% of zinc oxide or lime, or other set forth oxides or hydroxides, subjecting the mixture to sheeting operation and thereafter subjecting the formed sheet to mechanical or hydraulic pressure in a hot press, as for example a pressure of 800–825 pounds per square inch at the surprisingly low temperature of 275° F., for about 15 minutes, that a considerable reaction takes place between the resin and the modifying compound, and at a much lower temperature than could have been used in the absence of such pressure, the temperature being such that a sheet containing cellulose fibre would not be charred during the operation.

We have found that pressures of from about 600 to about 1,000 pounds per square inch may be employed and that a pressure of 800–825 pounds per square inch is generally satisfactory. The percentage of reaction product will vary with the time which may be from about 1 to about 60 minutes, and the temperature which may be from about 275° F., to about 340° F., as illustrated by the following table showing percentages of Vinsol reacted with 12.5% zinc oxide in a sheet prepared in accordance with the preceding example:

TABLE I

| Time, minutes | Temperature, °F. | Pressure, pounds per square inch | Per cent original Vinsol insolubilized |
| --- | --- | --- | --- |
| 15 | 275 | 825 | 16 |
| 30 | 275 | 825 | 22 |
| 45 | 275 | 825 | 26.5 |
| 60 | 275 | 825 | 31 |
| 5 | 320 | 825 | 31 |
| 1.5 | 340 | 825 | 26 |

We have further found that the incorporation of the resin modifying agents has a pronounced waterproofing effect. To demonstrate this two wet machine sheets were prepared, one entirely without zinc oxide, and the other with 5% by weight of the dried sheet. Each sheet was conditioned to 5% moisture and subjected to a pressure of 800 pounds per square inch for 10 minutes at 100 pounds steam. These sheets were then boiled in water for 15 minutes with the following comparative results:

TABLE II

| Paper, per cent zinc oxide | Boiling test—gain 15 minutes | | |
| --- | --- | --- | --- |
| | Weight | Edge caliper | Middle caliper |
| | Per cent | Per cent | Per cent |
| None | 64.0 | 140 | 116 |
| 5% | 7.3 | 21 | 20 |

The effect of the zinc oxide content on the swelling and water absorption of the respective sheets is thus strongly evident.

As a feature of this invention in addition to the foregoing, there is provided an enhanced binding effect when a plurality of dried sheets are composited under heat and pressure to produce a homogeneous unitary product. Thus, in the fabrication of angular and curvilinear products from the sheets or boards made in accordance with our invention a plurality of plies of our product may be composited under heat and pressure and the resulting product has an integral homogeneous structure resistant to delamination of the plies, as indicated in the following table:

TABLE III

Boiling tests—Laminated sheets

| Paper per cent zinc oxide | Delamination, minutes | | Gain per cent—15 min. | | | Gain per cent—30 min. | | |
| --- | --- | --- | --- | --- | --- | --- | --- | --- |
| | Initial | Serious | Wt. | Edge caliper | Middle caliper | Wt. | Edge caliper | Middle caliper |
| 0 | 2 | 2 | (1) | | | (1) | | |
| 1.35 | 17 | 20 | 33.0 | 91 | 56 | (1) | | |
| 3.73 | 33 | 47 | 6.4 | 26 | 29 | 15.2 | 36 | 40 |
| 4.45 | 69 | 102 | 8.2 | 24 | 26 | 18.0 | 50 | 41 |
| 5.59 | 95 | 100 | 6.7 | 28 | 27 | 13.1 | 45 | 41 |

[1] Delaminates.
NOTE.—All cures with 5% conditioning moisture; 10 minutes; 100 pounds steam; 800 pounds per square inch pressure.

The following table illustrates the effect of the moisture content of the sheets prior to laminating, the conditions of cure being the same as in the foregoing table:

TABLE IV

Boiling tests—Laminated sheets

| | Paper per cent ZnO | Delamination, minutes | | Gain per cent—15 min. | | | Gain per cent—30 min. | | |
| --- | --- | --- | --- | --- | --- | --- | --- | --- | --- |
| | | Initial | Serious | Wt. | Edge caliper | Middle caliper | Wt. | Edge caliper | Middle caliper |
| Bone dry | 3.73 | 3 | 6 | | | | | | |
| 3.4% moisture | 3.73 | 18 | 37 | | | | | | |
| 5.0% moisture | 3.73 | 33 | 47 | 6.4 | 26 | 29 | 15.2 | 36 | 40 |
| 7.0% moisture | 3.73 | 33 | 70 | 6.6 | 30 | 29 | 19.7 | 44 | 44 |

From the foregoing it will be evident that the moisture content of the paper greatly influences resistance to delamination, and that the sheets prior to lamination should preferably be conditioned to a moisture content of approximately 4 to 7%.

In accordance with a further embodiment of our invention we have found that in the formation of laminated products the dusting of the surfaces of the sheets with zinc oxide or the related substances prior to the consolidating step, and conveniently during the moisture conditioning of the sheets, provides an enhanced resistance to delamination and water absorption as shown by the following table, conditions of consolidation being the same as in the previous tables:

laminates produced by incorporating in the sheets prior to lamination and cure about 5% by weight of zinc oxide and calcium oxide respectively, and the cumulative enhancement of resistance to delamination and increased waterproofness by applying surface dusting of zinc oxide and calcium hydroxide respectively, to the sheets prior to lamination and consolidating cure.

These factors in turn are also cumulative to proper moisture conditioning of the sheets prior to lamination.

From the foregoing it will, of course, be evident

Table V
*Boiling tests—Laminated sheets*

| Description | Paper per cent ZnO | Delamination, minutes | | Gain per cent—15 min. | | | Gain per cent—30 min. | | |
|---|---|---|---|---|---|---|---|---|---|
| | | Initial | Serious | Wt. | Edge caliper | Middle caliper | Wt. | Edge caliper | Middle caliper |
| 5% moisture | 0 | 2 | 2 | (¹) | | | | | |
| Same+ZnO on surfaces | 0 | 6 | 25 | 56.5 | 84.0 | 89.0 | (¹) | | |
| Bone dry | 3.73 | 3 | 6 | (¹) | | | | | |
| Same+ZnO on surfaces | 3.73 | 28 | 38 | 9.1 | 61 | 50 | 37 | 111 | 106 |
| 5% moisture | 1.35 | 17 | 20 | 33.0 | 91 | 56 | (¹) | | |
| Same+ZnO on surfaces | 1.35 | 60 | 94 | 19.0 | 43 | 41 | | | |
| 5% moisture | 5.59 | 95 | 100 | 6.7 | 28 | 27 | 13.1 | 45 | 41 |
| Same+ZnO on surfaces | 5.59 | 122 | 142 | 5.7 | 18.5 | 10.1 | 13.7 | 28 | 20 |
| | Per cent CaO | | | | | | | | |
| 5% moisture | 5.00 | 45 | 110 | 3.3 | 23.8 | 20.0 | 13.2 | 49 | 37 |
| Same+Ca(OH)₂ on surfaces | 5.00 | 260+ | | 1.8 | 16.4 | 12.8 | 4.3 | 34 | 24 |

¹ Delaminates.

The comparative tests of the foregoing table illustrate the effect, by groups, of the use of a surface dusting, the basic metal compounds herein set forth on delamination and waterproofing of laminated sheets containing extracted pine wood pitch resin. In the foregoing table the column headed "paper per cent ZnO" in all instances indicates the amount of zinc oxide, or in the last two examples the amount of calcium oxide, incorporated within the body of the sheet material during the felting thereof, but does not include the amount of zinc oxide or lime dusted on the surface of the sheets. Thus the grouping of the examples by pairs greatly demonstrates the advantage or added advantages arising out of the surface dusting, all other things being equal. The first group of two tests illustrates the reduction of delamination tendency by mere surface dusting, the test sheets laminated in each of the two tests of this group being devoid of any incorporated zinc oxide content as indicated by the column headed "paper per cent ZnO," the difference between the two tests being solely as indicated in the first column headed "The description," that is, the same base sheets were employed in each of the two tests with the exception that in the second test zinc oxide was dusted on the surfaces. The second group of two tests illustrates that the surface dusting reduces tendency to delamination in a bone dry sheet which alone and even though containing an appreciable content of zinc oxide has a relatively poor delamination characteristic, and thus a surface dusting may compensate to some extent for insufficient moisture content.

The third group of two comparative tests illustrate the enhancement of resistance to delamination and improvement in waterproofness of material containing a generally insufficient per se content of zinc oxide in the sheet.

The fourth and fifth groups of comparative tests clearly demonstrate the character of the that various combinations of the basic metal substances in the body of the sheets and on their surfaces may be made when desired and other conditions such as moisture content, basic metal substance content and conditions of cure correlated.

Likewise it will be apparent that the surface treatment will permit the formation of extracted pine wood pitch resin containing products of enhanced surface waterproofness and hardness irrespective of whether the product is laminated or whether or not the body of the product or sheet contains any of the modifying substances.

Where desired, of course, the invention may be carried out in such a manner that the board or sheet material is supplied in the ordinary cold, slightly warm, or in a pre-heated condition to the pressing means, and the latter heated to the extent necessary to cause the resin to become sufficiently plastic, and to permit desired reaction to take place. Thus, the pressing time may vary within a range of the order of 10 seconds to 10 or more minutes, depending on the thickness of the board or sheet; the extent to which the sheet or board is preheated, if at all, and other factors.

While we have described our invention in connection with the production of sheets or boards, it is to be noted that the invention in its broad aspects is applicable to the production of any fibrous or felted fibrous structures utilizing the resin and its modifying agents of our invention, including fibrous products of curvilinear or irregular contour.

We claim as our invention:

1. A thermoplastic product comprising essentially a felted cellulosic fibrous material in intimate admixture with a substantial proportion of extracted pine wood pitch resin binder, a substantial proportion of said resin being in chemical combination with a modifying substance selected from the group consisting of the oxides and hydroxides of zinc, calcium, lead and magnesium, said product exhibiting the properties of having been consolidated and the binder caused to flow under heat and pressure.

2. A thermoplastic product comprising a plurality of superposed layers comprising essentially a felted cellulosic fibrous material permeated with extracted pine wood pitch as a binder, a substantial portion of the resin at the conjugation of the layer surfaces being of elevated softening point and in chemical combination with a modifying substance selected from the group consisting of the oxides and hydroxides of zinc, calcium, lead and magnesium, said product exhibiting the properties of having been consolidated and the binder caused to flow under heat and pressure.

3. A thermoplastic product comprising a plurality of superposed layers comprising essentially felted cellulosic fibrous material permeated with extracted pine wood pitch resin as a binder, a substantial portion of said resin within the layers and an added portion at the conjugation of the layer surfaces being of elevated softening point and in chemical combination with a modifying substance selected from the group consisting of the oxides and hydroxides of zinc, calcium, lead and magnesium, said product exhibiting the properties of having been consolidated and the binder caused to flow under heat and pressure.

4. A hard, stiff, heat and pressure consolidated thermoplastic sheet material comprising essentially a felted cellulosic fibrous structure, a substantial proportion of extracted pine wood pitch resin as a binder, and from about 5% to about 25% by weight of the resin of a resin modifying substance selected from the group consisting of the oxides and hydroxides of zinc, calcium, lead and magnesium, the resin permeating the fibrous structure and a substantial proportion thereof being of relatively elevated softening point and in chemical combination with said modifying substance, said product exhibiting the properties of having been consolidated and the binder caused to flow under heat and pressure.

5. A molded thermoplastic product comprising essentially felted cellulosic fibrous material, a substantial proportion of extracted pine wood pitch resin as a binder and from about 10 to about 15% of zinc oxide by weight of the resin, the resin permeating the fibrous structure and a substantial proportion thereof being of relatively elevated softening point and in chemical combination with the zinc oxide, said product exhibiting the properties of having been consolidated and the binder caused to flow under heat and pressure.

6. A molded thermoplastic product comprising essentially felted cellulosic fibrous material, a substantial proportion of extracted pine wood pitch resin as a binder and from about 10 to about 15% of lime by weight of the resin, the resin permeating the fibrous structure and a substantial proportion thereof being of relatively elevated softening point and in chemical combination with the lime, said product exhibiting the properties of having been consolidated and the binder caused to flow under heat and pressure.

PHILIP GOLDSTEIN.
HAROLD R. GILLETTE.